Aug. 29, 1939.  J. F. McCANN  2,171,158

SPEED REDUCING MECHANISM

Filed Dec. 2, 1938

INVENTOR.
John F. McCann.
BY Walter C. Ross
ATTORNEY.

Patented Aug. 29, 1939

2,171,158

UNITED STATES PATENT OFFICE 2,171,158

SPEED REDUCING MECHANISM

John F. McCann, Longmeadow, Mass., assignor to Baldwin-Duckworth Chain Corporation, Springfield, Mass., a corporation of Massachusetts Application December 2, 1938, Serial No. 243,585

1 Claim. (Cl. 74—219)

This invention relates to improvements in speed-reducing mechanism of the type adapted to provide a certain output speed relative to a certain input speed.

According to the principal objects of the invention, the apparatus is characterized by its compactness, relative simplicity, efficiency and relatively low cost. In a broad way the novel objects are accomplished by the provision of an apparatus which in the form of the invention at present preferred includes a three-stage speed reduction and two shafts which may be called the input and output shafts.

Speed-reducing units have heretofore been known which include various forms of gearing but for a number of reasons these have not been entirely satisfactory. Those prior art units including worm gearing are known to be but approximately 50 to 60 percent efficient and are relatively bulky and costly, whereas the apparatus of this invention is much more efficient, is less costly, and for a given horsepower or a certain speed-reduction the efficiency of my apparatus as distinguished therefrom has an efficiency approaching 100 percent and at least in excess of 90 percent.

Where gearing such as spur, spiral, and herringbone gears are used, the gears for a certain speed-reduction and load must of necessity have a certain width of face which makes for bulk and high costs. With the construction of this invention which is characterized by sprockets and driving chains as important constituents, for the same speed and load there is much less bulk and manufacturing costs may be reduced thereby. Also gearing is generally noisy which is a decided objection that is overcome entirely or to a large extent by the use of sprockets and chains.

According to this invention chains and sprockets are employed so that the apparatus may deliver approximately 98 percent of the of the available power, which is accounted for by the fact that a chain wraps around and operatively engages many of the sprocket teeth as distinguished from gearing where but a few teeth and often a single tooth must take the load. Gearing requires gears of relatively wide face contributing to the objectionable bulk referred to.

As a special feature of the invention, the speed-reducing mechanism is characterized by a multi-stage reduction in combination with an input and an output shaft arranged and constructed to provide compactness, low cost, and quietness and efficiency of operation.

The present preferred form of the invention will be described in connection with the accompanying drawing wherein.

Figure 1:
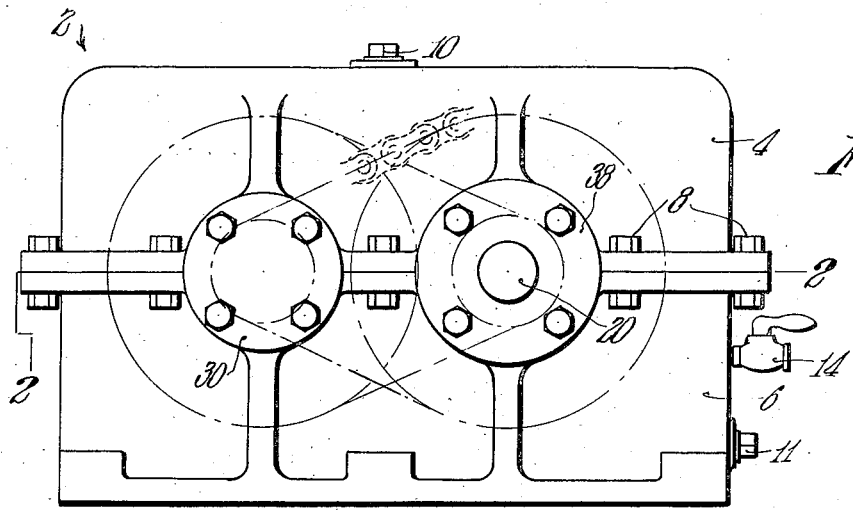
Fig. 1 is a side elevational view of an apparatus embodying the novel features of the invention.
Figure 2:
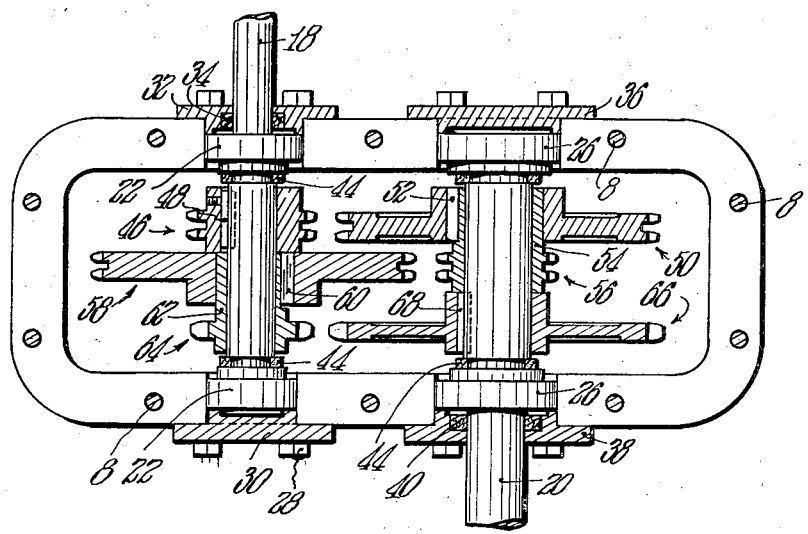
Fig. 2 is a sectional plan view on the line 2—2 of Fig. 1.

Referring to the drawing more in detail the invention will be fully described.

A casing or housing 2 is provided which preferably is made in sections such as 4 and 6 that are secured together by bolts 8 or otherwise to provide a non-leakable container. This is for enclosing the stages of the speed—reduction.

An inlet or opening in the member 4 and closed by a plug 10 provides a means for pouring lubricant into the housing. A drain plug 11 in an opening for draining the same is also provided. A pet cock 14 may be provided for maintaining a certain desired level of lubricant within the housing.

An input shaft is represented by 18 and this may be driven by a motor or other source of power to which it will be operatively connected as by gearing, sprockets and chain, pulley and belt or any other suitable connecting means. An output shaft 20 may be connected to any apparatus that it is desired or required to drive by means of the mechanism. The shaft 20 may be the input and the shaft 18 may be the output shaft if desired.

The input shaft 18 is mounted for free rotation by means of suitable anti-friction bearings indicated by 22 while shaft 20 is similarly mounted in bearings indicated by 26. A flange 28 secured to the housing covers the bore in which is located the bearing 22 at one side of the housing while a flange 32 receiving shaft 18 is secured to the opposite side of the housing and carries a resilient packing member 34 to provide lubrication and prevent leakage of lubricant along shaft 18.

Similar flanges 36 and 38 and a packing 40 are preferably provided in association with shaft 20. Washers or packings 44 of some suitable material may also be provided in association with the shafts 18 and 20 as shown.

One sprocket 46 of the first stage of the reduction mechanism is secured in some suitable manner as by a key 48 to the shaft 18. A cooperating sprocket 50 of the first stage of the reduction is secured as by a key 52 to a hub 54 of a sprocket 56 which is rotatable on the shaft 20. A chain operatively engages the sprockets 46 and 50.

A sprocket 58, with which the sprocket 56 previously referred to cooperates, provides the second or intermediate stage of the reduction and is secured as by means of a key 60 to a hub 62 of a sprocket 64 which is rotatable on shaft 18. As with the first stage, a chain operatively embraces the sprockets 56 and 58.

A sprocket 66 which with the sprocket 64 constitute the sprockets of the third stage, is secured as by means of a key 68 to shaft 20. Around sprockets 64 and 66 there is a chain operatively engaging the same.

Figure 3:
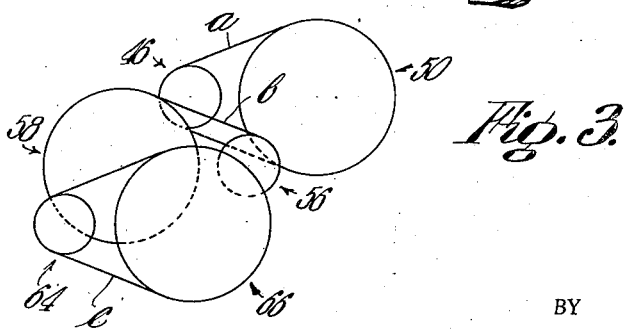
Fig. 3 is a diagrammatic view showing the elements of the multi-stage speed-reduction.

For purposes of clarity and convenience in description, I have shown in Fig. 3 a diagrammatic view of the elements of the multi-stage speed reduction. The chain operatively connecting sprockets 46 and 50 is indicated by $a$, while the chains operatively connecting sprockets 56 and 58 and sprockets 64 and 66 are indicated by $b$ and $c$ respectively.

Sprockets 54 and 64 are freely rotatable on their respective shafts 20 and 18 and to facilitate this they may be provided with bearings such as relatively thin tubular steel bearings which are lined with babbitt and there may be oil grooves in the shafts or in the bearings all as may be desired in order to provide the desired free rotation. The chains referred to are employed in connection with the sprockets for quietness, positive operation, efficiency and the generally desired characteristics.

By means of chains and sprockets less load is imposed on the bearings as distinguished from gearing and pulleys and belts, all of which impose bearing loads that do not contribute to power transmission. Also, by means of sprockets and chains, the maximum efficiency is obtained and economy in space and low cost are facilitated.

The sprockets and chains employed may be of various types but in the form of the invention at present preferred the chains $a$ and $b$ employed in the first and second stages of reduction are preferably of the multiple-strand type since the speeds of these two stages are relatively greater than in the last or third stage.

As is well-known, in a multiple-strand chain there are longitudinal rows of alternate rollers or bushings and links and spaced sets of teeth coacting with said rollers or bushings.

Because of the relatively slow speed of the third stage of the reduction, chain $c$ may be of the single-roller type but, as stated, the selection of the chains and sprockets may be varied depending on the operating requirements and conditions.

From the foregoing it will be observed that the apparatus of this invention is not only compact so as to occupy small space but it provides a multi-stage speed reducing unit wherein the chains and their cooperating sprockets constituting the stages are associated with a pair of shafts. This not only makes for simplicity and economy in construction but contributes to efficiency and quietness in operation since the chain rollers engage the sprocket with a rolling action as distinguished from the impact action of engaging gear teeth.

The housing is made so that the parts may at all times be automatically lubricated and to that end lubricant is carried by the housing up to a certain level as, for instance, up to the level of the pet cock. In the operation of the device the chains and sprockets carry sufficient lubricant or create sufficient turbulence in the lubricant as to bring about sufficient lubrication of the parts.

While I have described the invention in great detail and with respect to the present preferred form thereof, it is not desired to be limited thereto since many changes and modifications may be made therein without departing from the spirit and scope of the invention. What it is desired to claim and secure by Letters Patent of the United States is:

Speed-reduction apparatus of the class described comprising in combination, a closed housing including spaced front and rear walls, aligned bearings in said walls for spaced parallel input and output shafts, input and output shafts journalled in said bearings for rotation, a drive sprocket fixed on one end portion of said input shaft closely adjacent its bearing in said rear wall, a hub member freely rotatable on the other end portion of said input shaft, the inner end of said hub member being closely adjacent the inner face of said drive sprocket and its outer end being closely adjacent the opposite bearing in said front wall so as to prevent appreciable axial movement of the hub member on the shaft, said hub member being provided with a pair of spaced sprockets in fixed relation thereto so as to be rotatable therewith, a sprocket member fixed on one end portion of said output shaft closely adjacent its bearing in said front wall, a hub member freely rotatable on the other end portion of said output shaft, the inner end of the second-named hub member being closely adjacent the inner face of said sprocket member and its outer end being closely adjacent the opposite bearing in said rear wall so as to prevent appreciable axial movement of the second-named hub member on the shaft, said second-named hub member being provided with a pair of spaced sprockets in fixed relation thereto so as to be rotatable therewith, a chain operatively connecting said drive sprocket and that one of the pair of sprockets on the second-named hub member which is nearer said rear wall, a chain operatively connecting that sprocket of the pair on the first-named hub member which is nearer the drive sprocket and the other sprocket of said pair on the second-named hub member, and a chain operatively connecting said sprocket member and the other sprocket of the pair on the first-named hub member.

JOHN F. McCANN.